US012646892B2

(12) United States Patent
Nie

(10) Patent No.: US 12,646,892 B2
(45) Date of Patent: Jun. 2, 2026

(54) DATA CABLE AND ELECTRONIC DEVICE

(71) Applicant: VIVO MOBILE COMMUNICATION CO., LTD., Dongguan (CN)

(72) Inventor: Dongping Nie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 310 days.

(21) Appl. No.: 18/373,958

(22) Filed: Sep. 27, 2023

(65) Prior Publication Data

US 2024/0030657 A1 Jan. 25, 2024

Related U.S. Application Data

(63) Continuation of application No. PCT/CN2022/082472, filed on Mar. 23, 2022.

(30) Foreign Application Priority Data

Mar. 30, 2021 (CN) ........................ 202110340687.3

(51) Int. Cl.
*H01R 13/6581* (2011.01)
*H01R 13/6471* (2011.01)

(52) U.S. Cl.
CPC ..... *H01R 13/6581* (2013.01); *H01R 13/6471* (2013.01)

(58) Field of Classification Search
CPC ............ H01R 13/6581; H01R 13/6471; H01R 13/6625; H01R 31/065; H01R 13/6466;
(Continued)

(56) References Cited

U.S. PATENT DOCUMENTS

2017/0207589 A1 7/2017 Wu et al.
2021/0104844 A1* 4/2021 Li ...................... H01R 13/6464

FOREIGN PATENT DOCUMENTS

CN 2881897 Y 3/2007
CN 201927398 A 8/2011
(Continued)

OTHER PUBLICATIONS

International Search Report issued in corresponding International Application No. PCT/CN2022/082472, mailed Jun. 2, 2022, 4 pages.

(Continued)

*Primary Examiner* — Abdullah A Riyami
*Assistant Examiner* — Amara Anderson
(74) *Attorney, Agent, or Firm* — IPX PLLC

(57) ABSTRACT

This application provides a data cable and an electronic device. The data cable includes an AM connector, a Type-C connector, a connection cable, and at least one capacitor. Two ends of the connection cable are respectively electrically connected to the AM connector and the Type-C connector. The connection cable includes: an aluminum foil configured to shield an electromagnetic wave, where accommodation space is formed on an inner side of the aluminum foil; two power lines, two signal lines, and two internal grounding wires disposed in the accommodation space on the inner side of the aluminum foil; and an external grounding wire disposed on an outer side of the aluminum foil. The power lines are configured to provide a power supply, and the signal lines are configured to transmit a USB signal.

15 Claims, 5 Drawing Sheets

(58) Field of Classification Search
CPC .. H01R 13/6592; H01R 13/648; H01R 24/60; H01B 7/17; H01B 7/04; H01B 7/0045
USPC .................................................... 439/607.23
See application file for complete search history.

(56) References Cited

FOREIGN PATENT DOCUMENTS

| | | | | |
|---|---|---|---|---|
| CN | 201927398 | U | * | 8/2011 |
| CN | 201984844 | U | | 9/2011 |
| CN | 203884074 | U | | 10/2014 |
| CN | 104767079 | A | | 7/2015 |
| CN | 206271471 | U | | 6/2017 |
| CN | 206558836 | U | | 10/2017 |
| CN | 207250890 | U | | 4/2018 |
| CN | 207602916 | U | | 7/2018 |
| CN | 207782046 | U | | 8/2018 |
| CN | 105529108 | B | | 6/2019 |
| CN | 209029645 | A | | 6/2019 |
| CN | 209515228 | U | * | 10/2019 |
| CN | 211578456 | U | | 9/2020 |
| CN | 111740289 | A | | 10/2020 |
| CN | 113067212 | A | | 7/2021 |
| EP | 3591945 | A1 | | 1/2020 |
| KR | 20210009972 | A | | 1/2021 |

OTHER PUBLICATIONS

First Office Action issued in related Chinese Application No. 202110340687.3, mailed Aug. 3, 2022, 9 pages.
Second Office Action issued in related Chinese Application No. 202110340687.3, mailed Jan. 5, 2023, 5 pages.
Extended European Search Report issued in related European Application No. 22778691.0, mailed Sep. 6, 2024, 10 pages.

* cited by examiner

DATA CABLE AND ELECTRONIC DEVICE

CROSS-REFERENCE TO RELATED APPLICATIONS

This application is a continuation of International Application No. PCT/CN2022/082472, filed Mar. 23, 2022, which claims priority to Chinese Patent Application No. 202110340687.3, filed Mar. 30, 2021. The entire contents of each of the above-referenced applications are expressly incorporated herein by reference.

TECHNICAL FIELD

This application relates to the field of communication technologies, and in particular to a data cable and an electronic device.

BACKGROUND

With the development of electronic science and technology, a frequency at which a wire transmits a signal is increasingly high, and a requirement for Radiated Emission (RE) is increasingly strict. Currently, a material commonly used for a charging cable is woven metal or entwined metal to shield external RE of an internal signal line. The RE includes magnetic field radiation and electric field radiation.

During implementation of this application, it is found that the prior art has the following problems:

1. A short circuit between external weaving and a metal housing of a Type-C port may cause a port to be burnt.
2. An open circuit is formed between the external weaving and the Type-C port. The external weaving may be short-circuited with a grounding wire through aluminum foil, and contact is unstable. This easily causes an antenna effect, and enables RE radiation not to meet a standard. For example, the external weaving of the Type-C port is short-circuited with an internal grounding wire through the aluminum foil. After the open circuit is formed at the Type-C port, mutation occurs on a characteristic impedance, causing a peak value of a data cable to increase obviously between 150 M and 200 M, and RE performance of the data cable becomes worse. After the data cable is shortened, a frequency moves backward obviously.
3. In such connection manner, the external weaving is used as a loop current. The weaving is short-circuited with an internal grounding wire through in-direct contact with the aluminum foil. During use, impedance of the grounding wire is unstable.

SUMMARY

Embodiments of this application are intended to provide a data cable and an electronic device.

According to a first aspect, an embodiment of this application provides a data cable. The data cable includes a Type-A male (AM) connector, a Type-C connector, a connection cable, and at least one capacitor.

Two ends of the connection cable are respectively electrically connected to the AM connector and the Type-C connector. The connection cable includes:

an aluminum foil configured to shield an electromagnetic wave, where accommodation space is formed on an inner side of the aluminum foil;

two power lines, two signal lines, and two internal grounding wires disposed in the accommodation space on the inner side of the aluminum foil; and an external grounding wire disposed on an outer side of the aluminum foil.

The power lines are configured to provide a power supply, and the signal lines are configured to transmit a Universal Serial Bus (USB) signal. The internal grounding wires are disposed between the two signal lines, and are respectively connected to the two signal lines and the inner side of the aluminum foil, and the internal grounding wires are configured to provide a loop current for the power supply and provide a reference ground for the signal lines. The external grounding wire is connected to the outer side of the aluminum foil and a metal housing of the AM connector.

The at least one capacitor is disposed between the metal housing of the Type-C connector and a grounding wire of the connection cable and is configured to guide an electromagnetic wave coupled to the metal housing of the Type-C connector to the grounding wire. A grounding wire of the connection cable includes: the internal grounding wire or the external grounding wire.

According to a second aspect, an embodiment of this application further provides an electronic device. The electronic device includes an electronic device body and the foregoing data cable.

The data cable is removably electrically connected to the electronic device body.

In the embodiments of this application, a short circuit between the external weaving and the metal housing of the Type-C port is canceled, a risk of burning a port is reduced, and a capacitor is increased between the metal housing and the grounding wire synchronously, to enable a high-frequency signal radiated on the metal housing to be well grounded, and reduce an external radiation amount. The external weaving is replaced with the internal grounding wire. This simplifies a wire manufacturing process and reduces an antenna effect caused by discontinuity of a wire impedance caused by no grounding of the external weaving. In addition, the internal grounding wire is increased between the signal lines, to ensure that each signal line has a complete reference ground when transmitting a high-frequency signal, lessening fluctuation of a characteristic impedance of a bare signal line and reducing a characteristic impedance tolerance of a process signal line. Because there are two internal grounding wires in the connection cable, and a cross-sectional area is large, signal radiation may be reduced. When the wire is bent or curved, the characteristic impedance does not change greatly, ensuring RE performance of the data cable.

DETAILED DESCRIPTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, the following describes in detail the data cable in the embodiments of this application based on embodiments and application scenarios for the embodiments.

An embodiment of this application provides a data cable. The data cable includes an AM connector, a Type-C connector, a connection cable, and at least one capacitor.

Figure 1:
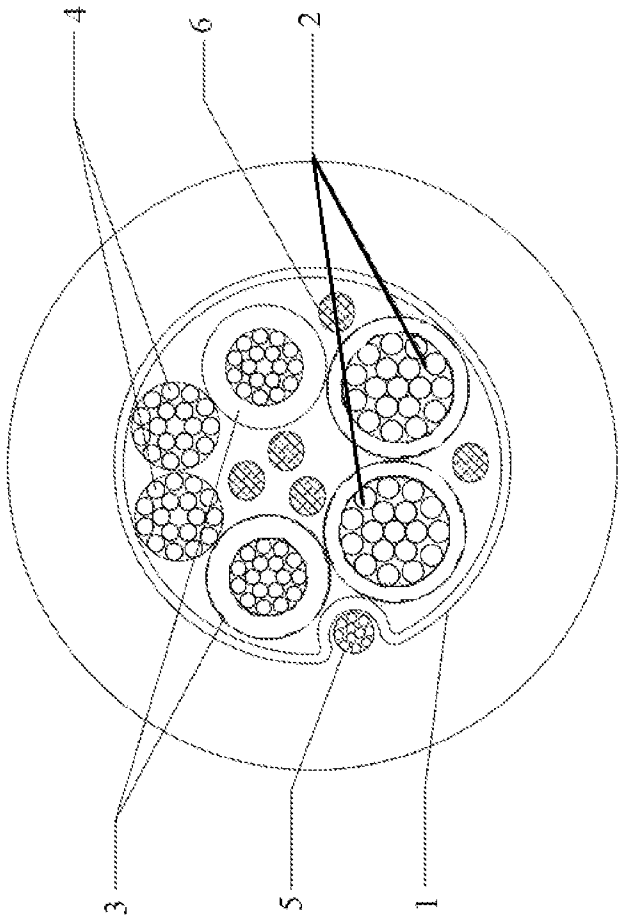
FIG. 1 shows a schematic diagram of a structure of a connection cable included in a data cable according to an embodiment of this application.

Two ends of the connection cable are respectively electrically connected to the AM connector and the Type-C connector. As shown in FIG. 1, the connection cable includes:

- an aluminum foil 1 configured to shield an electromagnetic wave, where accommodation space is formed on an inner side of the aluminum foil 1;
- two power lines 2, two signal lines 3, and two internal grounding wires 4 disposed in the accommodation space on the inner side of the aluminum foil 1; and
- an external grounding wire 5 disposed on an outer side of the aluminum foil 1.

The power lines 2 are configured to provide a power supply, and the signal lines 3 are configured to transmit a USB signal.

The internal grounding wires 4 are disposed between the two signal lines 3, and are respectively connected to the two signal lines 3 and the inner side of the aluminum foil 1. The internal grounding wires 4 are configured to provide a loop current for the power supply and provide a reference ground for the signal lines.

The external grounding wire 5 is connected to the outer side of the aluminum foil 1 and a metal housing of the AM connector. The external grounding wire is configured to enable the metal housing at the AM port to be conductive and grounded, and conduct a radiated electromagnetic wave on the aluminum foil 1 to ground.

Figure 4:
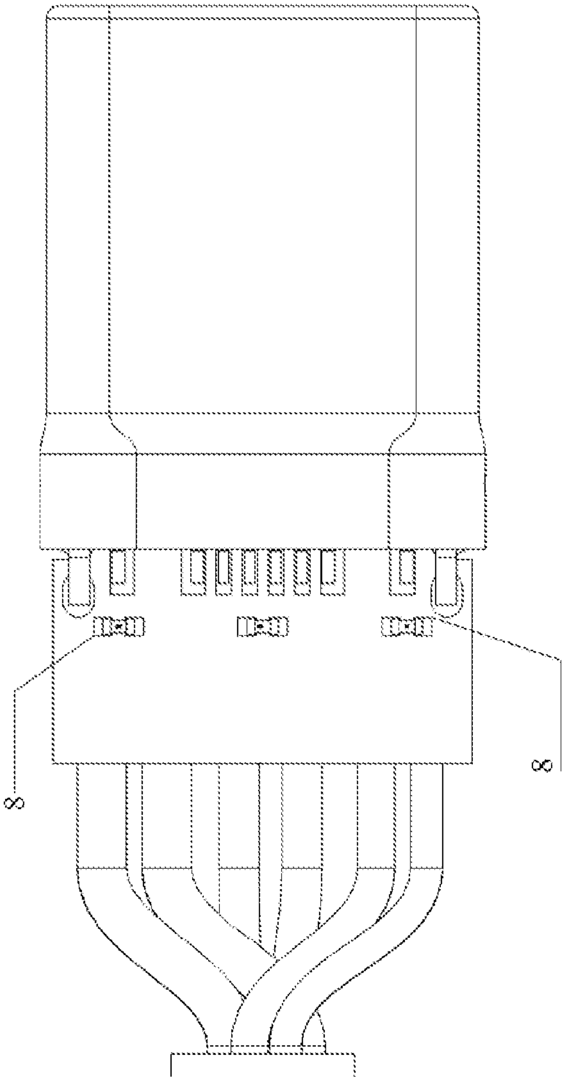
FIG. 4 shows a second schematic diagram of a PCB of a Type-C connector included in a data cable according to an embodiment of this application.

As shown in FIG. 4, at least one capacitor 8 is disposed between the metal housing of the Type-C connector and a grounding wire of the connection cable. The capacitor 8 is configured to guide an electromagnetic wave coupled to the metal housing of the Type-C connector to the grounding wire, to reduce external radiation of an electromagnetic signal coupled to the outer metal housing of the Type-C connector on a processing region and a Printed Circuit Board (PCB). A grounding wire of the connection cable includes the internal grounding wire or the external grounding wire.

Figure 5:
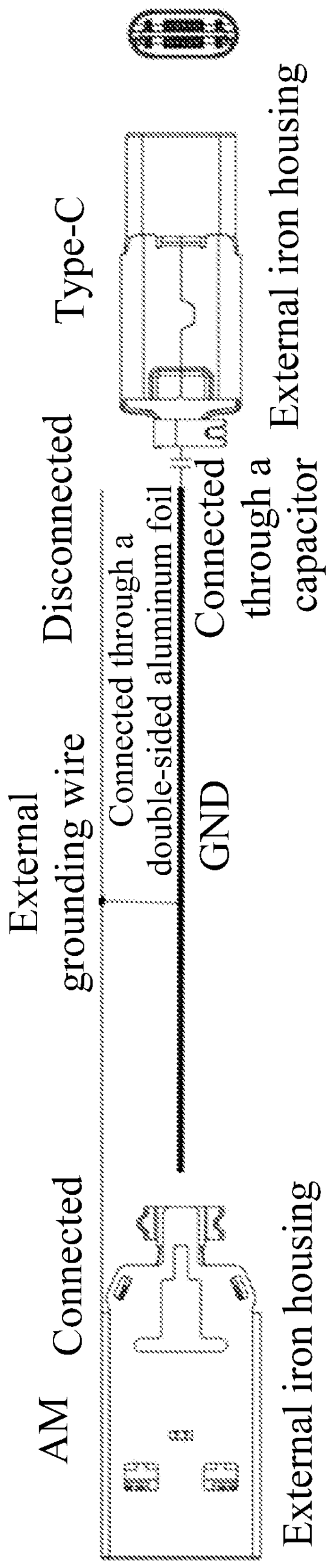
FIG. 5 shows a schematic diagram of connection of a data cable according to an embodiment of this application.

The capacitor is a high-frequency filtering capacitor. As shown in FIG. 5, a short circuit between external weaving and the metal housing of the Type-C port is canceled, and a risk of burning the port is reduced. The high-frequency filtering capacitor is increased between the metal housing and the grounding wire synchronously, and high-frequency grounding is used, to enable a high-frequency signal radiated on the metal housing to be well grounded, and reduce an external radiation amount.

In this embodiment of this application, the aluminum foil 1 can reduce external radiation of electromagnetic waves from a signal line 3 (D+/D−) during signal transmission, and enable conduction between the external grounding wire and the internal grounding wire.

In some embodiments, the two internal grounding wires are bare grounding wires.

In this embodiment of this application, the weaving is replaced with the bare grounding wire. This simplifies a wire manufacturing process and reduces an antenna effect caused by discontinuity of a wire impedance caused by no grounding of the external weaving. In addition, the bare grounding wire is increased between the signal lines (costs for the bare grounding wire of this part is lower than costs for the external weaving), to ensure that each signal line has a complete reference ground when transmitting a high-frequency signal, lessening fluctuation of a characteristic impedance of a bare signal line, and reduce a characteristic impedance tolerance of a process signal line from ±10 ohm to ±5 ohm. Because there are two bare grounding wires in the middle, and a cross-sectional area is large, external radiation of signals may be reduced. When the wire is bent or curved, the characteristic impedance does not change greatly, ensuring RE performance of the data cable.

In some embodiments, as shown in FIG. 1, the connection cable further includes:

- a nylon rope 6 disposed in the accommodation space on the inner side of the aluminum foil, configured to fill a gap between wires in the accommodation space. The nylon rope 6 is disposed to ensure that the wire is circular, and a tension resistance capability and a swing resistance capability of the wire are increased.

In this embodiment of this application, the weaving is replaced with the internal grounding wire. This simplifies a manufacturing process and reduces costs. In addition, the internal grounding wire may be soldered directly to the PCB, to enable the internal grounding wire to be connected stably and prevent unstable impedance of the grounding wire caused by poor contact. And the internal grounding wire is increased between the signal lines, to provide a better reference ground for the signal lines, reduce electromagnetic signals on the aluminum foil and the external grounding wire, and enable the electromagnetic waves to be mainly conducted between the signal lines and the internal grounding wire. This prevents enhanced external radiation of the data cable because an antenna effect is caused by impedance mismatch due to a short circuit between the external weaving and the metal housing of the Type-C port.

In at least one embodiment of this application, the aluminum foil is a double-sided aluminum foil or a multi-sided aluminum foil.

Figure 2:
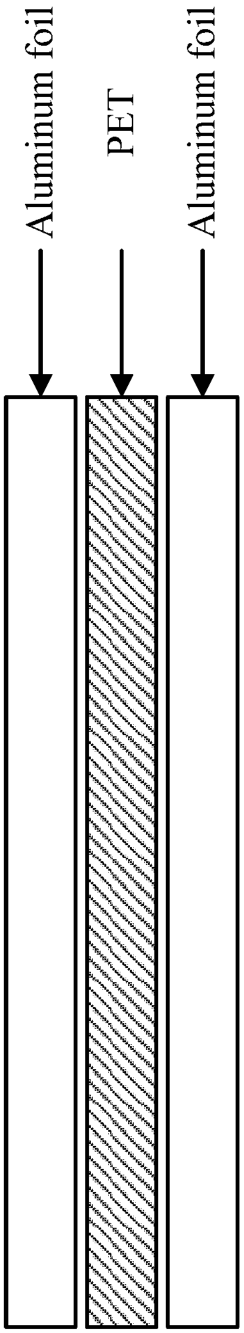
FIG. 2 shows a schematic diagram of an aluminum foil structure included in a connection cable of a data cable according to an embodiment of this application.
Figure 3:
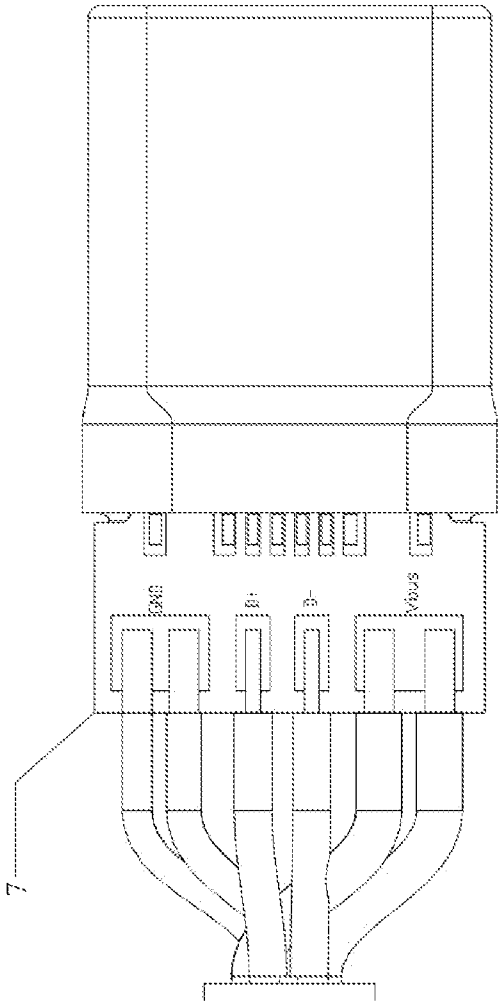
FIG. 3 shows a first schematic diagram of a PCB of a Type-C connector included in a data cable according to an embodiment of this application.

In this embodiment of this application, a single-layer aluminum foil is replaced with a double-layer aluminum foil (or a multi-layer aluminum foil), as shown in FIG. 2, to reduce a capability of great radiation of electromagnetic waves when passing through a first layer aluminum foil due to transmission. If a multilayer structure is used, after a first layer of aluminum foil is penetrated, a second layer of aluminum foil may attenuate most of radiated electromagnetic waves, to reduce an external radiation amount of an entire wire beam, and aluminum foil thicknesses of different layers are determined based on frequencies of different electromagnetic waves. For example, according to USB 2.0 transmission RE requirement, a radiation point is between 150 M and 250 M, a skin depth is approximately 7 μm through calculation, and a thickness of the aluminum foil may be selected to be greater than 7 μm. Multiple layers of aluminum foil with an approximate thickness are used appropriately, to prevent the wire from being excessively hard and having poor feeling due to excessively thick aluminum foil and reduce external radiation of electromagnetic waves to the greatest extent.

In this embodiment of this application, the single-sided aluminum foil is replaced with the double-layer aluminum foil or the multi-layer aluminum foil, and the skin depth is calculated based on a signal frequency. This optimizes the thickness of the aluminum foil and reduces external radiation of a high-frequency signal.

In some embodiments, based on the foregoing structure of the connection cable, corresponding PCB design is further optimized in this embodiment of this application, to reduce impedance mismatch caused by processing, and reduce radiation caused by signal reflection. That is, the Type-C connector includes a printed circuit board PCB 7. The PCB includes:

two grounding ports GND respectively corresponding to the two internal grounding wires;

two signal ports D+/D− respectively corresponding to the two signal lines; and two power ports Vbus respectively corresponding to the two power lines.

In some embodiments, the PCB includes: a top layer, at least one connection layer, and a ground layer.

A region, corresponding to the signal port, in the first connection layer is an avoidance region, and the first connection layer is a connection layer adjacent to the top layer.

In at least one embodiment of this application, the first connection layer includes:

a first region corresponding to the power port; and a second region corresponding to the grounding port.

A groove is formed between the first region and the second region, a front projection of the signal port on the first connection layer is located in the groove, and the groove is formed as the avoidance region corresponding to the signal port.

Design of the avoidance is performed in a frame region corresponding to a connection layer 2 (Inner Layer 2) under a signal line port (D+/D−) pad of the top layer. By increasing a distance between the D+/D− pad and the ground layer, a characteristic impedance of a pad region is increased, to compensate for reduction of a characteristic impedance of a soldering region after soldering due to a large pad area of the D+/D− pad, minimize an impact of a process on the characteristic impedance, ensure continuity of characteristic impedances of a wire connector, a processing region, and a wire region, and reduce reflection caused by impedance mismatch, reducing signal radiation, and improving RE performance.

Figure 6:
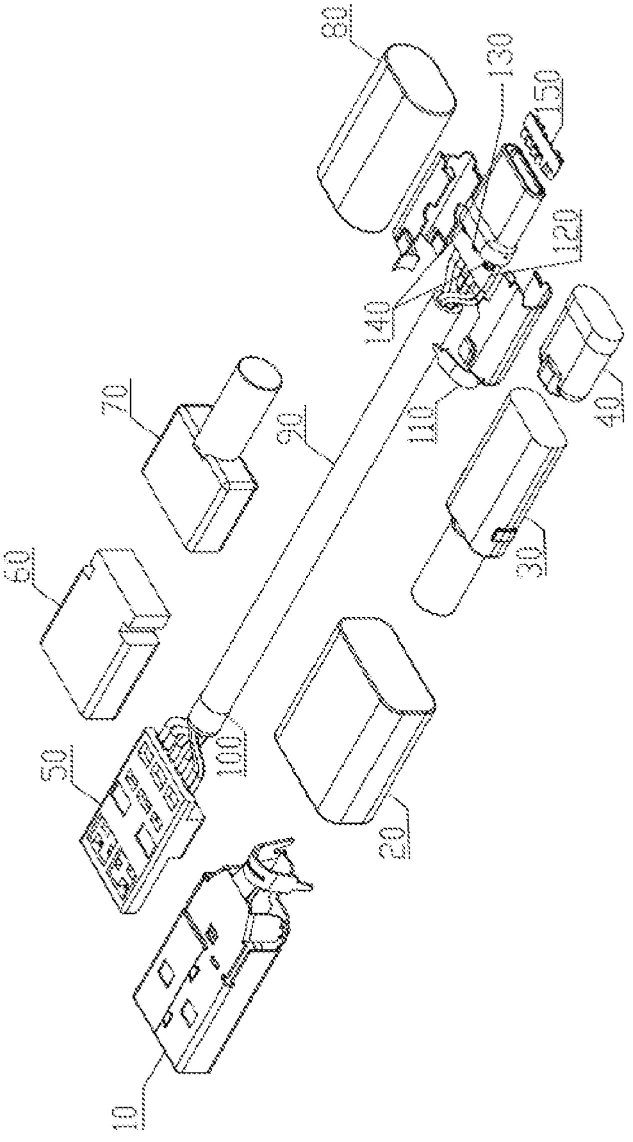
FIG. 6 shows an exploded view of a data cable according to an embodiment of this application.

FIG. 6 is an exploded view of a data cable according to an embodiment of this application. The data cable includes:

a metal housing 10 at an AM port, configured to increase an anti-pressure capability and electromagnetic shielding of a connector, reducing external radiation of an internal electromagnetic signal;

an external mold 20 at the AM port, configured to prevent water and dust from entering;

an SR internal mold 30 at a Type-C port, configured to increase an anti-swing capability of a wire;

an internal mold 40 at the Type-C port, configured to protect an internal solder joint and prevent water vapor from entering;

a rubber core and a terminal 50 at the AM port, configured for signal connection and power connection;

an internal mold 60 at the AM port, configured to protect an internal solder joint and prevent water vapor from entering;

an SR internal mold 70 at the AM port, configured to increase an anti-swing capability of a wire;

an external mold 80 at the Type-C port, configured to prevent water and dust from entering;

a wire 90, configured to provide connections for connectors at two ends;

a copper foil 100, configured to wrap a reflexed external grounding wire, enable an AM rivet jaw to be riveted and pressed on the external grounding wire, and enable the AM to be short-circuited with the external grounding wire;

a metal housing 110 at the Type-C port, a metal housing on the left and right of the Type-C port, configured to increase an anti-pressure capability of a Type-C connector and shield an electromagnetic signal;

a PCB 120 at the Type-C port, configured to connect a wire and a connector;

a resistor 130, namely, a pull-up 56 KΩ resistor, configured to communicate with a mobile phone and recognize a wire;

a capacitor 140, namely, a filtering capacitor, connected to a metal housing point GND, and configured to reduce external radiation of electromagnetic waves from the metal housing of the Type-C port; and a UV glue 150, configured to protect a solder joint, increase a tension capability of a wire, and prevent water vapor from entering the solder joint, resulting in tin migration.

To sum up, in this embodiment of this application, the weaving is replaced with the bare grounding wire. This simplifies a wire manufacturing process, optimizes overall costs for the data cable, and reduces an antenna effect caused by discontinuity of a wire impedance caused by no grounding of the external weaving. In addition, the bare grounding wire is increased between the signal lines (costs for the bare grounding wire of this part is lower than costs for the external weaving), to ensure that each signal line has a complete reference ground when transmitting a high-frequency signal, lessening fluctuation of a characteristic impedance of a bare signal line, and reduce a characteristic impedance tolerance of a process signal line from ±10 ohm to ±5 ohm. Because there are two bare grounding wires in the middle, and a cross-sectional area is large, external radiation of signals may be reduced. When the wire is bent or curved, the characteristic impedance does not change greatly, ensuring RE performance of the data cable. In addition, a risk of burning a port caused by metal housing grounding is reduced.

At least one embodiment of this application further provides an electronic device. The electronic device includes an electronic device body and the foregoing data cable.

The data cable is removably electrically connected to the electronic device body.

For example, in a case that the electronic device body is electrically connected to the data cable, a power supply end charges the electronic device body by using the data cable, or another device reads stored data of the electronic device body by using the data cable.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the implementations of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such understanding, the technical solutions of this application essentially or the part contributing to the conventional technology may be implemented in a form of a software product. The computer software product is stored in a storage medium (for example, a Read-Only Memory (ROM) or a Random Access Memory (RAM), a magnetic disk, or an optical disc), and includes several instructions for instructing a terminal (which may be a mobile phone, computer, a server, an air conditioner, a network device, or the like) to perform the methods described in embodiments of this application.

The embodiments of this application are described with reference to the accompanying drawings. However, this application is not limited to the foregoing implementations. The foregoing implementations are merely examples, but are not limiting. Under the enlightenment of this application, a person of ordinary skill in the art may make many forms without departing from the objective and the scope of the claims of this application, and these forms all fall within the protection scope of this application.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A data cable, comprising a Type-A (AM) connector, a Universal Serial Bus (USB) Type-C connector, a connection cable, and at least one capacitor, wherein two ends of the connection cable are respectively electrically connected to the AM connector and the USB Type-C connector; and the connection cable comprises:

an aluminum foil configured to shield an electromagnetic wave, wherein accommodation space is formed on an inner side of the aluminum foil, and the aluminum foil is a double-layer aluminum foil or a multi-layer aluminum foil;

two power lines, two signal lines, and two internal grounding wires disposed in the accommodation space on the inner side of the aluminum foil; and an external grounding wire disposed on an outer side of the aluminum foil, wherein the power lines are configured to provide a power supply, and the signal lines are configured to transmit a USB signal;

the internal grounding wires are electrically connected to the external grounding wire through the aluminum foil;

the internal grounding wires are disposed between the two signal lines, and are respectively connected to the two signal lines and the inner side of the aluminum foil, and the internal grounding wires are configured to provide a loop current for the power supply and provide a reference ground for the signal lines;

the external grounding wire is connected to the outer side of the aluminum foil and a metal housing of the AM connector;

the internal grounding wires are electrically connected to the metal housing of the AM connector through the external grounding wire and the aluminum foil; and the at least one capacitor is disposed between the metal housing of the USB Type-C connector and a grounding wire of the connection cable and is configured to guide an electromagnetic wave coupled to the metal housing of the USB Type-C connector to the grounding wire, wherein the grounding wire of the connection cable comprises: the internal grounding wire or the external grounding wire.

2. The data cable according to claim 1, wherein the USB Type-C connector comprises a printed circuit board (PCB), and the PCB comprises:

two grounding ports respectively corresponding to the two internal grounding wires;

two signal ports respectively corresponding to the two signal lines; and two power ports respectively corresponding to the two power lines.

3. The data cable according to claim 1, wherein the capacitor is a high-frequency filtering capacitor.

4. The data cable according to claim 1, wherein the connection cable further comprises:

a nylon rope disposed in the accommodation space on the inner side of the aluminum foil, wherein the nylon rope is configured to fill a gap between wires in the accommodation space.

5. The data cable according to claim 1, wherein each of the internal grounding wires is a bare grounding wire.

6. A data cable, comprising a Type-A (AM) connector, a Universal Serial Bus (USB) Type-C connector, a connection cable, and at least one capacitor, wherein two ends of the connection cable are respectively electrically connected to the AM connector and the USB Type-C connector; and the connection cable comprises:

an aluminum foil configured to shield an electromagnetic wave, wherein accommodation space is formed on an inner side of the aluminum foil;

two power lines, two signal lines, and two internal grounding wires disposed in the accommodation space on the inner side of the aluminum foil; and an external grounding wire disposed on an outer side of the aluminum foil, wherein the power lines are configured to provide a power supply, and the signal lines are configured to transmit a USB signal;

the internal grounding wires are disposed between the two signal lines, and are respectively connected to the two signal lines and the inner side of the aluminum foil, and the internal grounding wires are configured to provide a loop current for the power supply and provide a reference ground for the signal lines; and the external grounding wire is connected to the outer side of the aluminum foil and a metal housing of the AM connector; and the at least one capacitor is disposed between the metal housing of the USB Type-C connector and a grounding wire of the connection cable and is configured to guide an electromagnetic wave coupled to the metal housing of the USB Type-C connector to the grounding wire, wherein the grounding wire of the connection cable comprises: the internal grounding wire or the external grounding wire, wherein the USB Type-C connector comprises a printed circuit board (PCB), and wherein the PCB comprises:

two signal ports respectively corresponding to the two signal lines, a top layer, at least one connection layer, and a ground layer, wherein a region, corresponding to the two signal ports, in a first connection layer is an avoidance region, and the first connection layer is a connection layer adjacent to the top layer.

7. The data cable according to claim 6, wherein the first connection layer comprises:

a first region corresponding to the power port; and a second region corresponding to the grounding port, wherein a groove is formed between the first region and the second region, a front projection of the signal port on the first connection layer is located in the groove, and the groove is formed as the avoidance region corresponding to the signal port.

8. The data cable according to claim 6, wherein the PCB further comprises:

two grounding ports respectively corresponding to the two internal grounding wires; and two power ports respectively corresponding to the two power lines.

9. An electronic device, comprising an electronic device body and a data cable, wherein the data cable is removably electrically connected to the electronic device body, and the data cable comprises a Type-A (AM) connector, a Universal Serial Bus (USB) Type-C connector, a connection cable, and at least one capacitor, wherein two ends of the connection cable are respectively electrically connected to the AM connector and the USB Type-C connector; and the connection cable comprises:

an aluminum foil configured to shield an electromagnetic wave, wherein accommodation space is formed on an inner side of the aluminum foil, and the aluminum foil is a double-layer aluminum foil or a multi-layer aluminum foil;

two power lines, two signal lines, and two internal grounding wires disposed in the accommodation space on the inner side of the aluminum foil; and an external grounding wire disposed on an outer side of the aluminum foil, wherein the power lines are configured to provide a power supply, and the signal lines are configured to transmit a USB signal;

the internal grounding wires are electrically connected to the external grounding wire through the aluminum foil;

the internal grounding wires are disposed between the two signal lines, and are respectively connected to the two signal lines and the inner side of the aluminum foil, and the internal grounding wires are configured to provide a loop current for the power supply and provide a reference ground for the signal lines;

the external grounding wire is connected to the outer side of the aluminum foil and a metal housing of the AM connector;

the internal grounding wires are electrically connected to the metal housing of the AM connector through the external grounding wire and the aluminum foil; and the at least one capacitor is disposed between the metal housing of the USB Type-C connector and a grounding wire of the connection cable and is configured to guide an electromagnetic wave coupled to the metal housing of the USB Type-C connector to the grounding wire, wherein the grounding wire of the connection cable comprises: the internal grounding wire or the external grounding wire.

10. The electronic device according to claim 9, wherein the USB Type-C connector comprises a printed circuit board (PCB), and the PCB comprises:

two grounding ports respectively corresponding to the two internal grounding wires;

two signal ports respectively corresponding to the two signal lines; and two power ports respectively corresponding to the two power lines.

11. The electronic device according to claim 10, wherein the PCB comprises: a top layer, at least one connection layer, and a ground layer, wherein a region, corresponding to the two signal ports, in a first connection layer is an avoidance region, and the first connection layer is a connection layer adjacent to the top layer.

12. The electronic device according to claim 11, wherein the first connection layer comprises:

a first region corresponding to the two power ports; and a second region corresponding to the two grounding ports, wherein a groove is formed between the first region and the second region, a front projection of the signal port on the first connection layer is located in the groove, and the groove is formed as the avoidance region corresponding to the two signal ports.

13. The electronic device according to claim 9, wherein the capacitor is a high-frequency filtering capacitor.

14. The electronic device according to claim 9, wherein the connection cable further comprises:

a nylon rope disposed in the accommodation space on the inner side of the aluminum foil, wherein the nylon rope is configured to fill a gap between wires in the accommodation space.

15. The electronic device according to claim 9, wherein each of the internal grounding wires is a bare grounding wire.

* * * * *